United States Patent [19]
Halasa

[11] 3,868,354
[45] Feb. 25, 1975

[54] NEW CATALYST FOR HYDROGENATION OF ELASTOMERS AND THE PROCESS OF HYDROGENATION

[75] Inventor: Adel Farhan Halasa, Bath, Ohio

[73] Assignee: The Firestone Tire & Rubber Company, Akron, Ohio

[22] Filed: Dec. 13, 1973

[21] Appl. No.: 424,263

[52] U.S. Cl............ 260/94.7 H, 260/82.1, 260/83.3, 260/85.1, 260/85.3, 260/96 HY
[51] Int. Cl................................................. C08d 5/00
[58] Field of Search............. 260/94.7 H, 85.1, 82.1, 260/96 HY, 85.3

[56] References Cited
UNITED STATES PATENTS

| | | | |
|---|---|---|---|
| 3,412,174 | 11/1968 | Kroll | 260/683.9 |
| 3,531,445 | 10/1970 | Yoshimoto et al. | 260/94.9 H X |
| 3,673,281 | 6/1972 | Bronsten et al. | 260/94.7 H X |

*Primary Examiner*—William F. Hamrock

[57] ABSTRACT

The invention relates to the hydrogenation of an unsaturated elastomer in the presence of a catalyst which is the reaction product of cobaltous salt of lactam or another amide or urea reduced by a trialkyl or triaryl aluminum or a dialkyl or diaryl aluminum hydride.

3 Claims, No Drawings

NEW CATALYST FOR HYDROGENATION OF ELASTOMERS AND THE PROCESS OF HYDROGENATION

The invention relates to the catalytic hydrogenation of unsaturated elastomers. It includes the new catalyst which is employed.

The elastomer may be a natural rubber or a synthetic rubber, as for instance, polybutadiene, polypenteneamer or polyisoprene; an alternating copolymer of butadiene-ethylene, butadiene-propylene or butadiene-acrylonitrile; butadiene-isoprene; ethylene-propylene terpolymer (EPT): or a copolymer of butadiene or isoprene with (1) styrene or an alkyl derivative of styrene (e.g. alpha-methyl styrene, etc.) or (2) acrylonitrile. The hydrogenation of such elastomers is known in the art.

The catalyst is the reduced reaction product of cobaltous chloride with N-metal salt of a lactam or other amide or urea in which the metal is lithium, sodium or potassium. The reduced reaction product of cobaltous bis-caprolactam is the preferred catalyst.

Various advantages are found in the use of the catalyst of this invention. It is soluble in hydrocarbon solvents. Because it forms a homogeneous solution, it is easily handled and can be used in continuous hydrogenation of processes and is still active at higher temperatures of, for example, 250°–350° F.

The hydrogenated elastomers, depending on the degree of saturation, are useful as thermoplastic elastomers. They are stable at high temperatures and are resistant to oxidative degradation. They are useful for the manufacture of tires, shoe soles, hoses, luggage, upholstery in automobiles, etc., and are useful as adhesives.

Kroll U.S. Pat. No. 3,412,174 uses the reaction product of a transition-metal salt (e.g. a cobalt salt of a carboxylic acid), an organometallic (e.g. triisobutyl aluminum) and a Lewis base, as a catalyst for hydrogenation. The catalyst is ineffective at high temperatures and unstable over a long period of time. The patent does not suggest the use of lactam in producing the catalyst reaction product, nor does it suggest the use, alternatively, of an amide or urea as contemplated herein or the use of the reactants in the preferred ratio disclosed herein.

The cobaltous salt of caprolactam, etc. is readily produced by gently heating a solution of the lactam or other amide or urea with n-butyllithium or the like to form the lithium salt and then reacting this with cobaltous chloride by heating the solution before adding the aluminum reducing agent.

The following are illustrative of the lactams, other amides and ureas that may be used.

The general formula for the lactams is

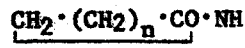

in which $n$ is 0 to 20. Caproeactam in which $n = 4$ is preferred.

The general formula of the other amides is:

in which $R_1$ and $R_2$ are the same or different and are hydrogen or an alkyl group containing 1 to 10 or more carbon atoms or an aryl group of the class consisting of phenyl, tolyl, xylyl or the like. Representative compounds include:

Acetamide 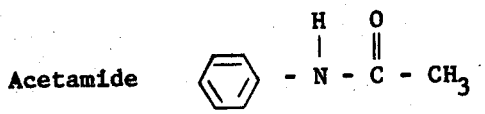

Acid amide 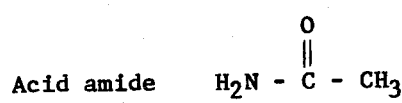

N-methylacid amide 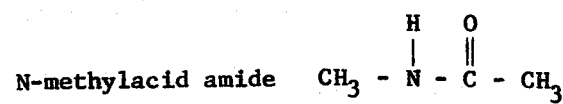

N-methylbenzamide 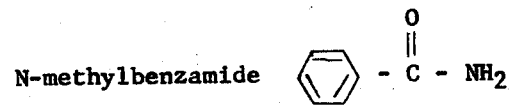

Ureas 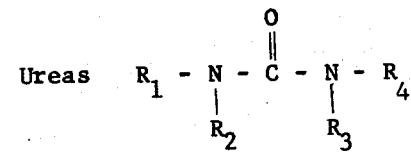

in which $R_1$, $R_2$, $R_3$ and $R_4$ are the same or different and each may be hydrogen, a straight or branched chain (saturated or unsaturated) or cyclic alkyl group of 1 to 21 carbon atoms or an aryl group from the class consisting of phenyl, tolyl, xylyl, etc. The following are illustrative: urea, methyl urea, dimethyl urea, ethylhexyl urea, dioctyl urea, diallyl urea, diphenyl urea, butylphenyl urea, etc.

The reaction is preferably carried out in toluene, but other solvent (usually aromatic) in which the reaction product is soluble may be used. The reaction product is isolated and characterized.

The cobalt bis-caprolactam or other salt is then reduced with a trialkyl or triaryl aluminum or a dialkyl or diaryl aluminum hydride. The alkyl groups may comprise 1 to 8 or more carbon atoms and the aryl groups comprise phenyl, tolyl, xylyl, etc. Mixed alkyl and aryl groups may be present as in dialkyl phenyl aluminum, etc. Trimethyl or triethyl or triisobutyl aluminum or diisobutyl aluminum hydride is preferred. During the reaction of the cobalt lactam or other salt with the aluminum reducing agent, a reduced product is formed which is active in hydrogenation of unsaturated polymers and may have other uses.

The preferred molar ratio of the cobalt compound to the lactam, etc. to the aluminum compound is 1:2:3. However, more reducing agent can be used, but is unnecessary and uneconomical. The presence of the lactam or the like in the hydrogenation catalyst medium stabilizes the intermediate Cobalt' which is the active catalyst in the hydrogenation. Presumably, the bis-lactam chelates with the cobalt. It makes the hydrogenating compound soluble in the reaction medium and prevents it from aggregating into an insoluble compound.

The molar ratio of the reducing agent to the transition metal complex of the lactam, amide or urea is very critical. At Al/Co ratio of 10 or more, a disadvantageous increase in the molecular weight of the polymer is produced. Sometimes the reaction leads to gelation. The preferred ratio of Al/Co is 3:1.

The molar ratio of the transition metal to the lactam, amide or urea in the reaction is very critical. The best ratio is 2 lactam, amide or urea/1 cobalt salt, such as the chloride, bromide or iodide.

Co(lactam)$_2$, Co(amide)$_2$ and Co(urea)$_2$ are not known in the literature, and their formation is illustrated by the following series of reactions. The equations refer to the use of lactam which is preferred.

The following schematically illustrates the formation of cobaltous lactam:

Preparation of Catalyst

This refers to the preparation of catalyst from caprolactam, but is illustrative of the general procedure for producing catalysts from other lactams, other amides, and ureas.

In preparing the catalyst from caprolactam, 19.0 mM of caprolactam (anhydrous, polymerization grade) is dissolved in 200 ml of toluene. To this solution is added 38.0 mM of n-butyllithium in hexane. The fluffy lithium salt of caprolactam forms immediately and goes into solution in the toluene upon gentle heating. Any temperature between 0° and 50° C. may be used, but about 50° C. is preferred.

To this solution is added 19.0 mM of anhydrous cobaltous chloride. The solution turns blue immediately and becomes an intense, deep blue when the reaction mixture is heated to 80° C. for 15 minutes. The reaction mixture can be heated to any temperature between about 50° and 100° C. Cooling the toluene solution of cobaltous bis-caprolactam to about −10° to 20° C., and preferably 5° C., is followed by reduction with 57 mM of triisobutyl aluminum. The blue solution changes to brown, the reduced compound remaining in solution. This solution is then used for hydrogenation of the elastomer. In carrying out the reaction, the molar ratio of cobaltous chloride/lactam/triisobutyl aluminum is sub-

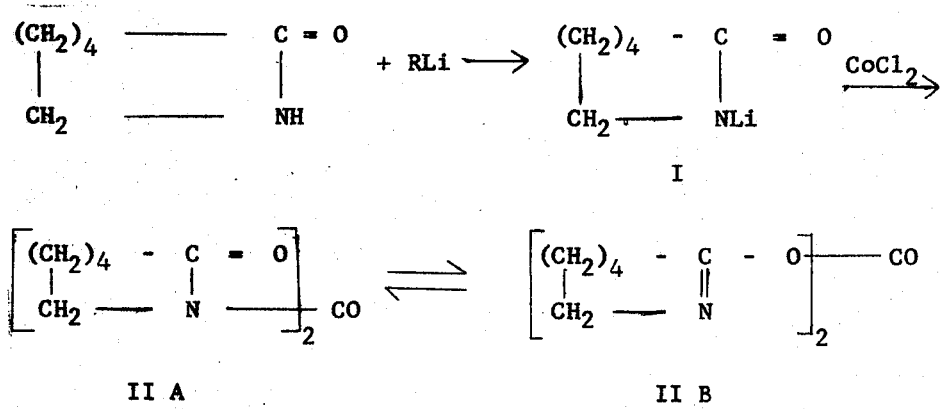

Compound I is well known in the literature as the lithium salt of caprolactam; however, the cobalt salt is not known in the literature. It has a definite structure. It may exist in either of its tautomeric forms as Compound II A or II B. In any case, both compounds, after reduction by trialkyl or triaryl aluminum or dialkyl or diaryl aluminum halide, can be employed as active catalysts in the hydrogenation of elastomers.

It is understood from the above scheme that any compound with an enolizable proton or a nitrogen adjacent to a carbonyl can be reacted with cobaltous chloride to yield derivatives of cobalt which are active as hydrogenation catalysts, like lactams, other amides or ureas.

The following which refers to the preparation of cobaltous lactam illustrates, in general, the preparation of any cobaltous amide or cobaltous urea. The use of the catalyst which follows, refers to hydrogenation of butadiene-styrene and polybutadiene but is illustrative of the hydrogenation of other unsaturated elastomers.

stantially 1:2:3. More generally, the molar ratio of the cobaltous bis-lactam or other amide or urea to the aluminum compound is substantially 1:3.

Hydrogenation

The hydrogenation reaction may be carried out in a stainless steel autoclave equipped with a pressure gauge and appropriate plumbing for introducing hydrogen into the reactor. The unsaturated elastomer is dissolved in an organic solvent. The temperature of the autoclave is adjusted to about 122° C. and then the catalyst is added to the solution with continuous stirring. The amount of catalyst used is between about 0.02 mm and 1.0 mM per gram of elastomer. The hydrogenation reaction proceeds immediately, and within 1 to 2 hours the hydrogenation is completed. The refractive index of the rubber may be used to measure the uptake of hydrogen. The polymer is isolated and characterized by NMR which shows the absence of olefinic peaks between 275 and 325 Hz.

The hydrogenation conditions can be varied depending upon the particular polymer to be hydrogenated. Noramlly, hydrogenation reactions can be carried out at temperatures ranging from 25° to 500° C. However, the preferred conditions are 25° to 150° C. with pressures ranging from about 20 to 15,000 psig., and the preferred range is 100 to 200 psig., and preferably from 25 to 1,000 psig. For elastomers that contain terminal or internal olefinic units, for example, polybutadiene, polyisoprene, butadiene-isoprene copolymer, butadiene-styrene copolymer, butadiene-ethylene copolymer, isopropene-isobutylene copolymer; isoprene-ethylene copolymer, butadiene-isobutylenecopolymer, butadiene-vinyl chloride copolymer, isoprene-vinyl chloride copolymer, butadiene-propylene copolymer and isoprene-propylene copolymer, etc., the preferred hydrogenation temperature ranges from 1° to 120° C. at pressures of 25 to 500 psig. However, for rubbers that contain some aromatic groups, such as butadiene-styrene, etc., the preferred hydrogenation conditions are temperatures between 0° and 120° C. and pressures of 500 to 15,000 psig.

The length of the hydrogenation time is not too critical and may be from 1 minute to 20 hours, depending upon the process employed and the rubber used.

The catalyst system described herein can be used for selective hydrogenation of various unsaturated aliphatic and aromatic groups. It may be used for hydrogenation of terminal olefins in addition to internal olefins, such as 1,2-polybutadiene, etc.

The extent of the hydrogenation can be controlled by the amount of hydrogen introduced, and the rate at which the hydrogenation takes place is controlled by the temperature and the pressure.

EXAMPLE I

A 10% solution of 200 grams of butadiene is prepared in 90% hexane. Any aliphatic solvent may be used. The solution is purged several times with hydrogen and with the temperature adjusted to 100° C; 1.0 mM of cobaltous bis-caprolactam complex reduced with 3 mM of triisobutyl aluminum is added and the reaction is subjected to hydrogen pressure of 200 psig. and agitated for 4 hours under constant 200 psig. hydrogen pressure. The reaction mixture is cooled to about room temperature and the polymer is coagulated by stirring it into iso-propanol.

The polymer is completely saturated indicating complete hydrogenation of the polymer has been accomplished as shown by the characteristic absorption peaks at 100 Hz of aliphatic methylene groups obtained by NMR analysis. The spectrum was void of any olefinic groups at 275–325 Hz.

EXAMPLE II

The procedure of Example I is followed, using 200 grams of butadiene-styrene (75/25) copolymer and 1.0 mM of Co(lactam)$_2$ reduced with 3 mM of trialkyl aluminum. The analysis showed complete hydrogenation.

EXAMPLE III

The procedure of Example I was followed, using 200 grams of butadiene-styrene (75/25) copolymer and 0.46 mM of Co(lactam)$_2$ reduced with 1.38 mM triisobutyl aluminum. The hydrogenation temperature was 250° F. and the hydrogenation was carried out at 200 psig. The product isolated showed showed 100% hydrogenation by NMR analysis.

EXAMPLE IV

The procedure of Example I was followed, using 200 grams of isoprene-styrene (80/20) copolymer and 1.0 mM of Co(lactam)$_2$ reduced with 3.0 mM triisobutyl aluminum at 250° F. and 200 pisg. of hydrogen. The product analysis by NMR showed 100% hydrogenation.

I claim:

1. The process of hydrogenating an unsaturated elastomer which comprises hydrogenating the same in solution in an aliphatic solvent in the presence of 0.02 mM to 1.0 mM per gram of elastomer of a reduced cobaltous bis-lactam catalyst, which lactam having the formula

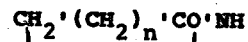

in which n=0 to 20 and which reducing agent is a trialkyl or triaryl aluminum or a dialkyl or diaryl aluminum hydride at a temperature of 250° to 500° C. and a pressure of 25 to 1,000 psig.

2. The process of claim 1 in which the elastomer is from the class consisting of homopolymers of conjugated dienes containing 4 to 8 carbon atoms, copolymers of such conjugated dienes and copolymers of such conjugated dienes and vinyl monomers, and the hydrogenation is effected with a reduced cobaltous bis-lactam catalyst at 25° to 150° C. at a pressure of 100 to 300 psig.

3. The process of claim 1 in which the polymer is hydrogenated with reduced cobaltous bis-caprolactam catalyst at a temperature of 0° to 100° C. and a pressure of 25 to 500 psig.

* * * * *

UNITED STATES PATENT OFFICE
CERTIFICATE OF CORRECTION

Patent No. 3,868,354            Dated February 25, 1975

Inventor(s) Adel Farhan Halasa

It is certified that error appears in the above-identified patent and that said Letters Patent are hereby corrected as shown below:

In Column 1, Line 59, "Caproeactam" should read --Caprolactam--.

In Column 4, Line 61, "mm" should read --mM--.

In Column 5, Line 3, "Noramlly" should read --Normally--.

In Column 5, Line 13, "butadiene-isobutylenecopolymer" should read --butadiene-isobutylene copolymer--.

Signed and Sealed this

Twenty-seventh Day of July 1976

[SEAL]

Attest:

RUTH C. MASON
Attesting Officer

C. MARSHALL DANN
Commissioner of Patents and Trademarks